Dec. 12, 1950 D. KOSSOVITCH 2,533,672
DOUBLE-ACTING ELECTRIC STOVE
Filed July 8, 1947 3 Sheets-Sheet 1
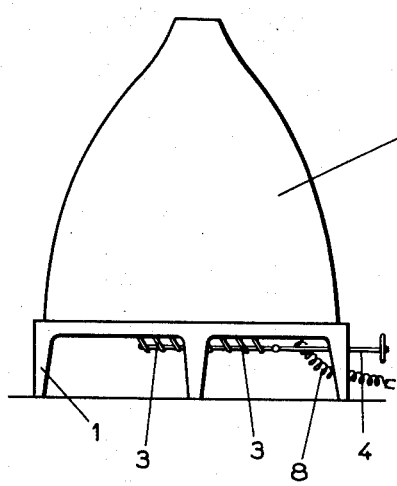
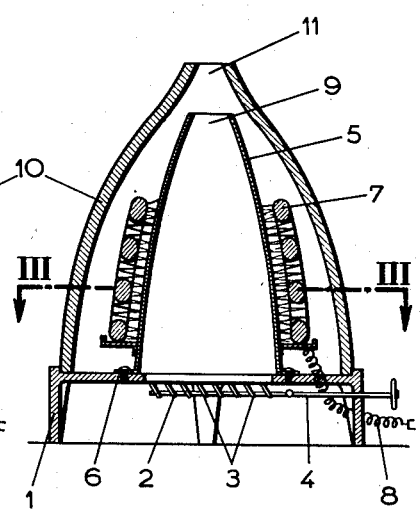
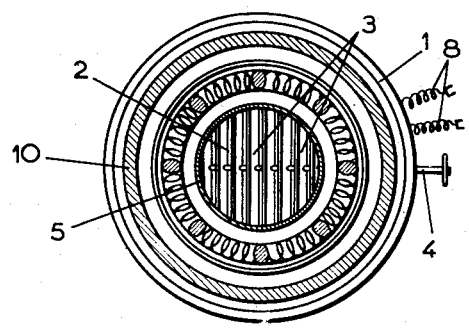
Inventor
D. Kossovitch
By
Henderoth, Lind & Ponack
Attorneys Dec. 12, 1950 D. KOSSOVITCH 2,533,672
DOUBLE-ACTING ELECTRIC STOVE
Filed July 8, 1947 3 Sheets-Sheet 2

Inventor
D. Kossovitch
By Wenderoth, Lind & Ponack
Attorneys

Dec. 12, 1950 D. KOSSOVITCH 2,533,672
DOUBLE-ACTING ELECTRIC STOVE
Filed July 8, 1947 3 Sheets-Sheet 3
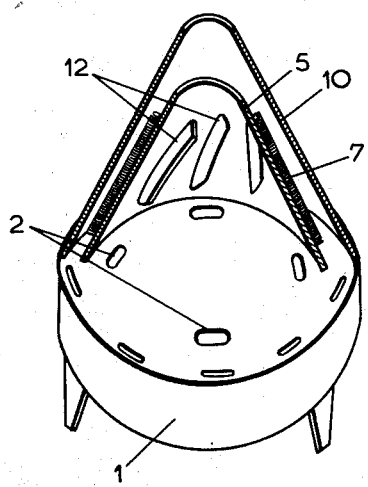
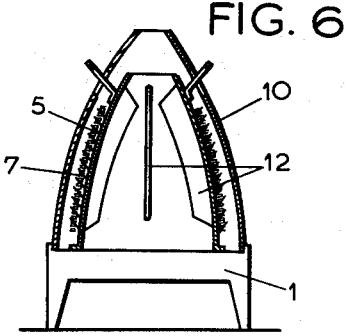
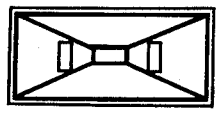
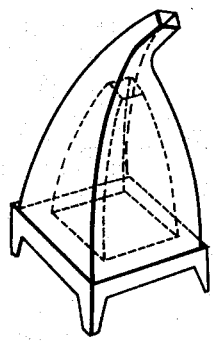
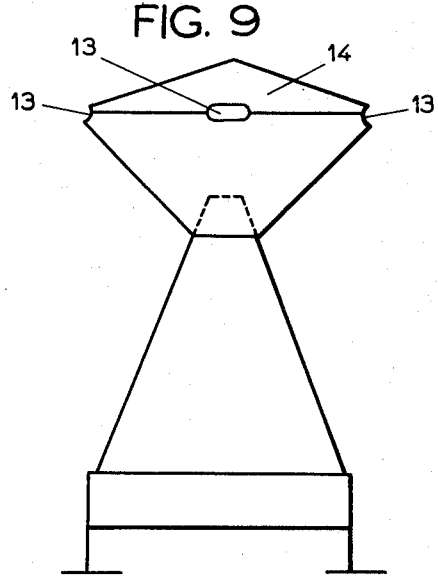
Inventor
D. Kossovitch
By Wenderoth, Lind & Ponack
Attorneys Patented Dec. 12, 1950

2,533,672

UNITED STATES PATENT OFFICE 2,533,672

DOUBLE-ACTING ELECTRIC STOVE

Dimitry Kossovitch, Levallois-Perret, France

Application July 8, 1947, Serial No. 759,533
In France July 19, 1945

2 Claims. (Cl. 219—38)

A heating apparatus in order to produce quick and uniform heating in a room by continuous circulation of air should have the following qualities:

1. It should become heated internally so as to create a circulation of air.
2. It should present minimum overall dimensions, whilst having the greatest possible heating area.
3. It should ensure a regular circulation, with a stirring of the cold air which is heated therein.
4. It should show the greatest possible contact area, through the use of smooth walls or conducts adapted to be heated to participate in the radiation of heat.
5. It should be readily transportable.

My present invention has for its object to provide the new article of manufacture formed by a heating apparatus accomplishing all the above objects.

The heater is internally provided with heating surfaces formed by heat conductive cone frustums made of metal for instance, which may be flat or in the form of a symmetrical or dissymmetrical pointed arch or ogive. Their side walls may be concave or convex, smooth or corrugated. Said cone frustum or frustums are opened at their base and top; their larger base rests on a supporting base formed with an aperture of fixed or adjustable cross section. Said heating surfaces may be placed upon the base vertically or at an angle.

Externally of an in contact with said con frustum or frustums one or more electric resistors is or are arranged the magnitude of which is selected according to the heating surface of the cone.

The air in contact with the internal walls of said heating surface becomes heated and is discharged through the upper aperture of the cone frustum, thereby drawing up air through the apertures formed in the supporting base.

In order to increase the heating area of the device and therefore the efficiency of the resistors, there is arranged upon said first cone frustum and out of contact therewith and with the related resistors a second cone frustum likewise opened at its top and which may be a good heat conductor.

Said cone frustum may for example be made of sheet iron, cast iron, copper, ceramic material or any other material which may be a conductor of heat and is adapted to withstand high temperatures.

The opposite bases of said cone frustums may be formed with any configuration such as circular, oval or elliptic. Said cone frustums should also be replaced by truncated pyramids having a rectangular, triangular or polygonal base.

In order to illustrate some ways in which the invention may be carried into practice, some exemplary embodiments will now be described without in any way attempting to restrict the scope of the invention, and in reference with the accompanying drawings, wherein:

Fig. 1 shows an external view of the device according to my invention.

Fig. 2 shows the same device in sectional view.

Fig. 3 is a cross section on line III—III of Fig. 2.

Figs. 5 and 6 show in sectional view a modification of my invention.

Fig. 7 shows a plan view of Fig. 6.

Fig. 8 is a perspective showing of a modification.

Fig. 9 shows my device provided with a heat reflector.

Figure 10:
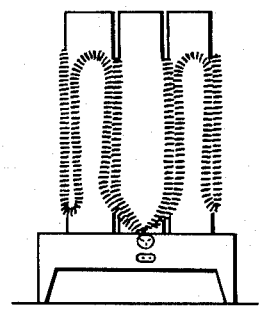
Fig. 10 shows in elevation a modification of my invention including three cones.
Figure 4:
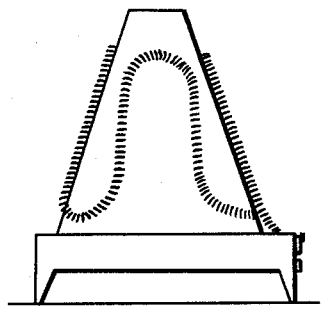
Fig. 4 shows the device of the invention after removal of the upper truncated cone.

Now referring to the drawings, my heating apparatus comprises a base or support 1 formed with apertures 2 the cross section of which is adjustable for instance by means of slats 3, actuated with a push-pull rod 4. Upon said base, a pipe 5 of preferably conical form opened at both ends is placed and its base 6 is secured on the support 1, the apertures 2 being located within said base 6. All around the pipe 5 an electric resistor 7 is coiled, its magnitude being calculated with a view to insure the required heating action. Current is supplied through wires 8. Said resistors being suitably insulated may be in contact with the pipe 5. The latter, which is heated by the resistor when the current supply is on, is effective to heat the air contained in said pipe.

The air thus heated rises and is discharged through the upper apertures 9 of the pipe, thus creating a draught of cool air into and through the apertures 2 in the base 1.

In order to increase the heating area of the apparatus and also the efficiency of the resistors and the amount of air being heated, the first pipe 5 may be surrounded with a second pipe 10, preferably also of conical form and resting through its bottom base upon the supporting base 1. Said pipe 10 is opened at its top 11 to enable the heated air to be discharged therethrough. Said second pipe 10 being heated by radiation from the resistors 7 should be a conductor of heat to allow the layers of air surrounding it externally to be properly heated.

The pipes 5 and 10 are both heat conductive and may for instance be of sheet iron, cast iron, copper, ceramics and should in any case be capable of withstanding high temperatures.

Said pipes may have any suitable configuration such as; circular, frusto-conical or in the form of truncated pyramids. The upper end of said pipes may be curved so as to direct the heated air into any desired direction.

Said pipes could also if desired be provided with a corrugated surface to increase their radiating area.

In order to further increase the efficiency of such a heater radiating fins 12 adapted to increase the heating area of the internal pipe 5 may be formed internally of said pipe 5. Such radiating fins would essentially be secured so as to extend in a plane parallel with the generatrices of the pipe, but they could also be provided to extend at an angle therewith.

Figure 11:
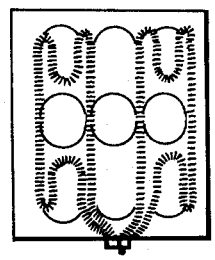
Fig. 11 shows a plan view of Fig. 10.
Figure 12:
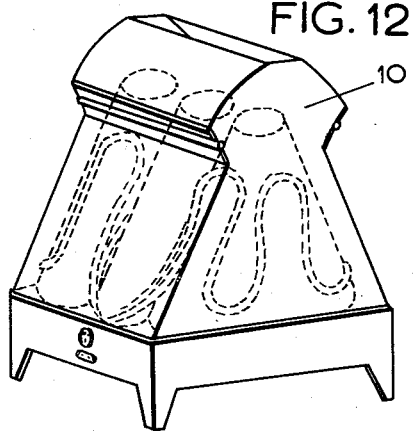
Figs. 12, 13 and 14 illustrate three modifications of my invention.
Figure 13:
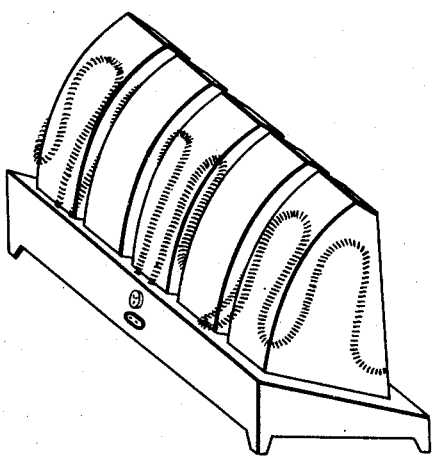
Figure 14:
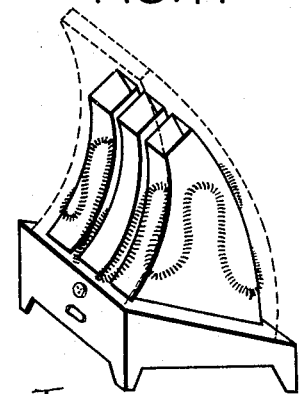

Figs. 7, 8, 10, 11, 12, 13 and 14 illustrate modifications of the device according to my invention wherein the pipes are provided with particular forms.

Fig. 9 shows a heater according to my invention provided at its top with a heat deflecting means enabling discharge of heated air through the outlets 13 while the cap 14 is adapted to heat the surrounding air through radiation.

Figs. 10, 11, 12, 13 and 14 illustrate devices according to my invention especially adapted for large heat outputs, by the use of a plurality of pipes on each of which resistors are provided. By successively connecting each of them into circuit the thermal output of the heater may be adjusted. Each of said resistors is mounted on its particular pipe which in turn may be covered either with a common casing 10 or with several casings.

It will of course be understood that the embodiments described may be modified, improved and completed in various ways and elements therein may be replaced by equivalent ones without exceeding the scope of the invention.

What I claim is:

1. An air heater comprising in combination a base having an adjustable aperture, an inner pipe of heat conductive material mounted upon said base, surrounding said aperture of generally ogival form and opened at its top, an electric resistor surrounding said inner pipe and means to supply current thereto, and an outer pipe of heat conductive material also mounted on said base surrounding said inner pipe and said resistor out of contact therewith and opened at its top.

2. An air heater comprising in combination a base having an adjustable aperture, an inner pipe of heat conductive material mounted upon said base surrounding said aperture and opened at its top, an electric resistor surrounding said inner pipe and means to supply current thereto, and an outer pipe of heat conductive material of generally ogival form also mounted on said base surrounding said inner pipe and said resistor out of contact therewith and opened at its top.

DIMITRY KOSSOVITCH.

REFERENCES CITED

The following references are of record in the file of this patent:

UNITED STATES PATENTS

| Number | Name | Date |
|---|---|---|
| 512,797 | Bowen | Jan. 16, 1894 |
| 740,125 | Hallberg | Sept. 29, 1903 |
| 1,038,410 | Mies | Sept. 10, 1912 |
| 1,560,377 | Daly | Nov. 3, 1925 |
| 1,827,788 | Hicks | Oct. 20, 1931 |
| 1,901,038 | Marshall | Mar. 14, 1933 |
| 1,926,473 | Wood | Sept. 12, 1933 |
| 1,937,669 | Repogle | Dec. 5, 1933 |
| 2,262,892 | Heard | Nov. 18, 1941 |

FOREIGN PATENTS

| Number | Country | Date |
|---|---|---|
| 104,867 | Sweden | June 30, 1942 |